3,264,560
APPARATUS FOR SENSING RELATIVE ROTATION BETWEEN A PAIR OF ELEMENTS
Walter J. Cheney, San Mateo, Calif., assignor to Ampex Corporation, Redwood City, Calif., a corporation of California
Filed Nov. 2, 1962, Ser. No. 235,063
10 Claims. (Cl. 324—70)

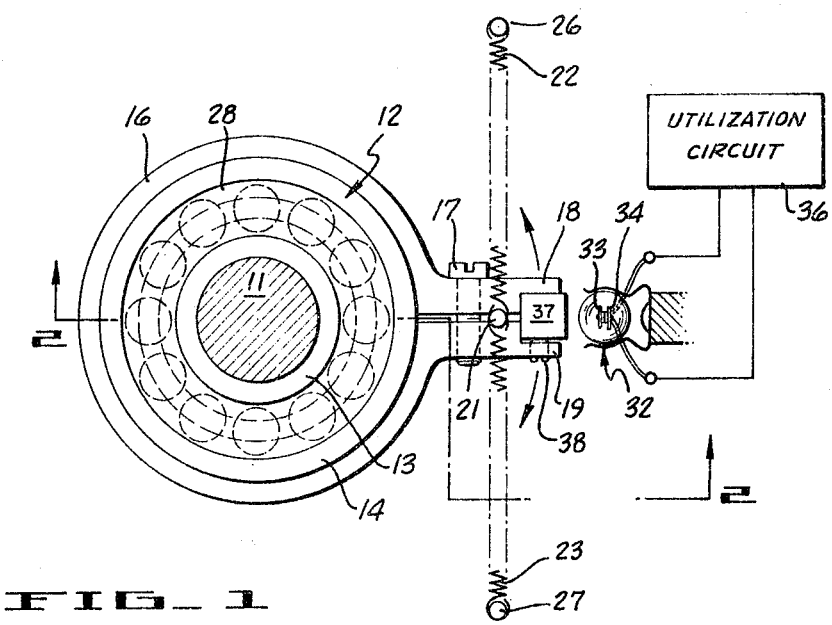
FIG_1
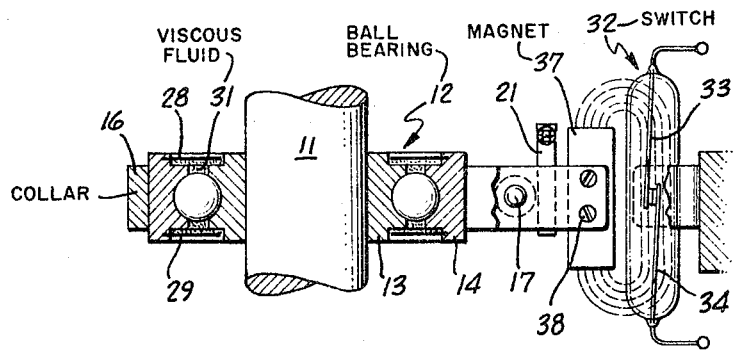
FIG_2
Walter J. Cheney
INVENTOR.
BY Robert L. Clay
ATTORNEY

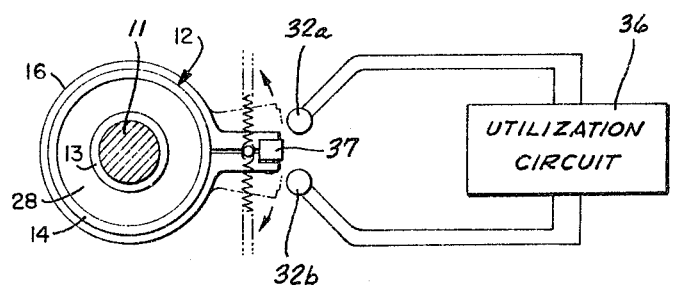
FIG_3
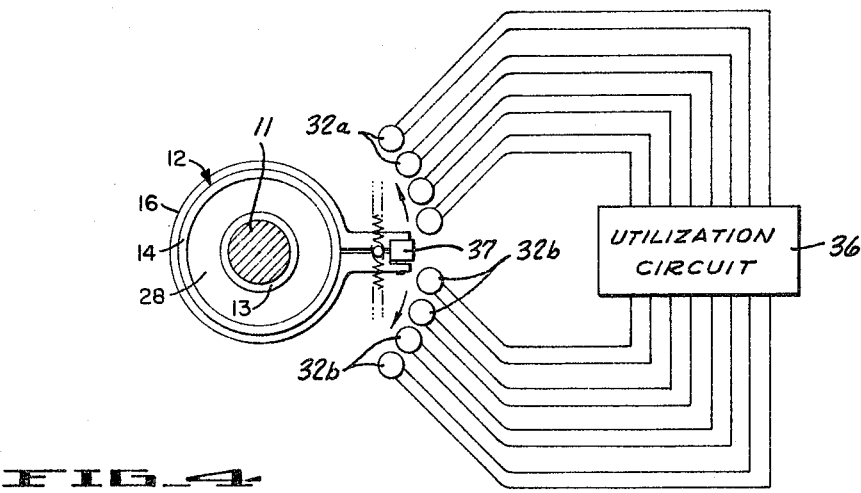
FIG_4

This invention relates to means for sensing motion or lack of motion between two relatively movable elements, and particularly to such means including a direct coupling between the elements.

Previously in the art, motion sensors have comprised photoelectric or other sensing means not directly coupling the two elements (e.g., a rotatable shaft and mounting) between which motion is to be sensed. However, the photoelectric type of sensor is complicated, expensive, and not completely dependable.

Alternatively, sensors of the art have comprised direct couplings generally of a friction type, for example, a brake shoe mounted for frictional engagement with a shaft and for limited movement in the direction of rotation of the shaft. When the shaft reverses rotation, the brake shoe is displaced in an opposite direction, indicating a change of shaft direction. However, when the shaft merely comes to a stop and remains stationary, the brake shoe remains in its last motion-indicating position. Furthermore, the frictional forces acting on the indicator, when motion is taking place, are substantially independent of the speed of motion, so that the displacement of the indicator is not a function of the speed and provides no measure thereof.

In short, the frictional indicator is sensitive to direction and reversal of motion, but cannot distinguish between motion and lack of motion, and cannot indicate the relative speed of the motion.

Accordingly, it is an object of this invention to provide a motion sensor capable of sensing either motion or lack of motion between two relatively movable elements.

It is another object of the invention to provide a motion sensor capable of sensing and indicating the direction of rotation of a shaft, and a stationary condition of the shaft as well.

It is a further object of the invention to provide a sensor capable of indicating both direction and speed of rotation of a shaft, whether said speed is of zero value or of any other value.

It is still a further object of the invention to provide a sensor as above described and suitable for inexpensive and easy manufacture and sale and high reliability in operation.

A motion sensor in accordance with the invention includes an indicating member mounted for rotation with respect to a rotatable shaft, and coupled to the shaft by means of a fluid coupling. The indicating member is spring loaded toward a stable normal position, from which it is rotationally displaced by the fluid coupling when the shaft is rotating, the direction of displacement corresponding to the direction of shaft rotation. Because the coupling is a fluid and not a friction coupling, the displacement force transmitted to the indicator is a function of the speed of shaft rotation, and the displacement actually produced, against the spring load, is a measure of the speed. When the shaft ceases to rotate, the fluid coupling, unlike a friction coupling, becomes totally ineffective to hold the member in either of its motion-indicating positions against the spring force, and the indicator member returns to its normal position, indicating a stationary condition of the shaft. Electrical switches and circuits are positioned to be operated by the indicator member in its various positions, so as to electrically indicate both direction and speed of shaft rotation from zero value (stationary shaft) to any predetermined value.

Further objects and advantages together with a better understanding of the invention may be had by reference to the following description, taken in conjunction with the accompanying drawings in which:

FIGURE 1 is a plan of a sensor in accordance with the invention;
FIGURE 2 is a cross-sectional elevation taken along the plane of lines 2—2 of FIGURE 1;
FIGURE 3 is a plan of a variational form of the invention; and
FIGURE 4 is a plan of a further variational form of the invention.

Referring now to the drawings and particularly to FIGURE 1 thereof, there is shown a rotatable shaft 11, the motion of which is to be sensed. Accordingly there is affixed to the shaft a substantially frictionless bearing means 12 here shown as a ball bearing. The ball bearing has an inner race 13, which is press-fitted or otherwise affixed on the shaft to rotate therewith, and an outer race 14. An indicating collar 16 is clamped around the periphery of the outer race 14 as by means of a bolt 17 threaded through a pair of radial coupling lips 18 and 19 of the collar. A pin 21 is also clamped between the lips 18, 19 and serves for attaching the ends of two tension springs 22 and 23. The springs 22, 23 are stretched in opposite directions perpendicular to the radius defined by lips 18, 19 and are secured at their ends to solidly anchored pins 26 and 27.

It is to be noted that the tensions in the respective srpings 22, 23 are great enough to completely overcome whatever minor frictional coupling there may be in the ball bearing 12, so that whenever the shaft 11 is not rotating the lips 18, 19 of the collar 16 are constrained by the springs to occupy or return to the centralized position illustrated in FIGURE 1. It follows that even when the shaft is rotating, the minor frictional coupling inherent in the bearing is completely insufficient to alone cause displacement of the lips 18, 19 away from the centralized position illustrated in FIGURE 1.

In order to produce displacement of the lips 18, 19 when the shaft 11 is rotating, so as to provide an indication of the direction or speed of rotation, the bearing 12 is further constructed to provide a fluid coupling between the shaft 11 and the collar 16. As shown particularly in FIGURE 2, a pair of fluid seals 28 and 29 are provided for closing off the space between the inner and outer races 13 and 14 of the bearing; and the space defined between the races and the two fluid seals is filled with a viscous fluid 31, such as silicon lubricant.

It is a well known characteristic of frictional couplings between two relatively movable elements, that the friction or shearing forces that may be exerted by one of the elements upon the other is substantially the same whether or not the elements are actually moving with respect to one another, and that this force remains substantially the same independent of the velocity of relative movement, if any. In other words the frictional coupling is substantially the same for all speeds of relative movement from zero up.

Accordingly previous devices known in the art, which are dependent upon friction couplings for an indication of relative movement, have been limited by the fact that they are able to indicate only the direction or change of direction of such movement but not the degree of speed involved and not a state of zero velocity.

On the other hand in a fluid coupling such as is used in the present invention, the fluid shearing force produced by the moving member upon the stationary member is a function of the relative velocity between the members, and because the collar 16 is spring loaded towards a centralized position, the collar is constrained to have a different rotational displacement for every value of the relative velocity of shaft 11, i.e., for zero velocity and for all other velocities in either direction. For example, if the shaft 11 of FIGURE 1 is rotating in a clockwise direction, then the lips 18, 19 are displaced by the fluid coupling in a clockwise direction, with consequent elongation of the tension spring 22. Since the tension in the spring increases with increasing elongation, the degree of displacement of the collar becomes a function of the coupling force exerted by the fluid coupling, which in turn is a function of the speed of rotation of shaft 11. Furthermore upon stopping of the shaft 11, the fluid coupling ceases to exert any rotational force upon the collar, and spring 22 returns the collar to its centralized position. Such return would not be possible with a friction coupling, since upon stopping of the shaft the friction force remains substantially unchanged and balances the force of the return spring just as it does when the shaft is turning. If the return spring in a friction coupling is strong enough to return an indicator to a centralized position when there is no relative movement, then it follows that the spring is strong enough to prevent displacement of the indicator even when the shaft is turning. In the present invention of course this condition is true with respect to the strength of the springs 22, 23 in proportion to the very minor frictional coupling inherent in the bearing, and as a consequence the coupling of the invention is independent of friction and operates to perform its function as a fluid coupling only.

To provide electrical indications of the state of relative motion of the shaft 11 there are several possible arrangements. If it is desired to electrically indicate only the presence or absence of motion of the shaft, a single electrical switch may be positioned at the tips of lips 18, 19 in their centralized position as shown in FIGURE 1. In this example, the switch is a magnetic reed switch 32 the contacts 33 and 34 of which are coupled to a utilization circuit 36 of a type well known in the art. To operate this switch, a permanent magnet 37 is secured in a yoke formed in the end of lips 18, 19 as by means of a pair of set screws 38. As shown in FIGURE 2, when the shaft 11 is not turning and the lips 18, 19 are in their centralized position, the magnetic flux from the magnet 37 causes the contacts 33, 34 of the switch to close. However whenever the shaft 11 is rotating in either direction, the magnet 37 is displaced away from the switch 32, and the contacts 33, 34 are permitted to open, as they are spring loaded to do. The opening of the contacts indicates to the utilization circuit 36 that the shaft 11 is turning, although no indication is provided to the circuit 36 of the direction of movement. It may be said that the arrangement as illustrated in FIGURE 1 also provides an indication of a minimum or threshold speed of the shaft 11 corresponding to the displacement of the magnet 37 that is necessary to permit the switch to open.

If it is desired to provide an indication not only of the presence or absence of motion of the shaft 11 but also of the direction of motion, a pair of switches 32a and 32b may be used as shown in FIGURE 3. In this example each of the switches is positioned some distance from the centralized position of the magnet 37, so that when both of the switches are opened the utilization circuit 36 is informed that the shaft 11 is stationary. If the shaft 11 rotates in a clockwise direction, the switch 32b is closed, while the switch 32a remains open, and the utilization circuit is informed that the shaft 11 is rotating in a clockwise direction. If the switch 32a is closed while the switch 32b is open, the utilization circuit is informed that the shaft is rotating in a counterclockwise direction.

If it is desired to provide an indication not only of presence or absence of rotation and direction of rotation, but also of the speed of rotation, an arrangement such as that illustrated in FIGURE 4 may be used. In this example an array of four switches 32a and four switches 32b is used, the switches being mounted at varying distances from the centralized position of the magnet 37. Thus, depending upon which of the switches is closed while the rest are open, the utilization circuit 36 is informed of the precise displacement of the magnet 37 and thus of the precise speed and direction of rotation of the shaft 11.

In operation, when the shaft 11 rotates the magnet 37 is displaced against the urging of one or the other of the springs 22, 23 by the coupling action of the fluid 31, the displacement being in the same direction as the direction of rotation of the shaft and to a degree that is a function of the speed of rotation of shaft. By the use of a single switch positioned at a centralized position as shown in FIGURE 1, the presence or absence of rotation of the shaft is sensed. With a pair of switches positioned on either side of the centralized position as shown in FIGURE 3, the presence or absence and the direction of motion of the shaft is sensed. When an array of switches displaced on either side of the centralized position as shown in FIGURE 4, the presence or absence, direction, and speed of rotation of the shaft 11 is sensed. Whenever the shaft stops rotating, the fluid coupling becomes ineffective and the springs 22, 23 return the magnet 37 to its centralized position, and the switches in any of the above described arrangements indicate to the utilization circuit 36 that the shaft has stopped moving.

It will be understood that the force of gravity may be employed in place of the springs 22, 23; that switches of various types other than those described may be used and are equally effective; and that if magnetic reed switches such as those described are used, the switches may be biased by a fixed permanent magnet to be normally in a close position, and to be opened by magnet 37 whose poles are opposed to those of the bar magnet; such arrangements being well known in the art. Further, it will be understood that fluid couplings of types other than those illustrated may be used.

Thus there has been described a motion sensor including an indicating means, which in turn includes the indicating member 16 mounted for rotation with respect to a rotatable element such as a shaft, and also with respect to fixed element or ground, coupled and to the shaft by means of a fluid coupling. The indicating member is spring loaded or urged as by gravity or other forces toward a stable normal position, from which it is rotationally displaced by the fluid coupling when the shaft is rotating, the direction of displacement corresponding to the direction of shaft rotation. Because the coupling is a fluid and not a friction coupling, the displacement force transmitted to the indicator is a function of the speed of shaft rotation, and the displacement actually produced, against the spring load, is a measure of the speed. When the shaft ceases to rotate, the fluid coupling, unlike a friction coupling, becomes totally ineffective to hold the member in either of its motion-indicating positions, and the indicator member returns to its normal position, indicating a stationary condition of the shaft. The indicating means may also include electrical switches and circuits positioned to be operated by the indicating member in its various positions, so as to electrically indicate both direction and speed of shaft rotation from zero value (stationary shaft) to any predetermined value.

What is claimed is:

1. Apparatus for sensing relative rotation between a pair of elements, comprising:
    indicating means including a member mounted for rotation about the relative rotational axis of said elements, and means for urging said member toward a normal position indicating lack of rotation between said elements, and said indicating means also having at least one position with said member displaced from said normal position indicating motion between said elements; and
    a fluid coupling between said indicating member and one of said elements for causing said member to move to at least one of said displaced positions upon rotation between said elements, and for permitting return of said member to said normal position upon cessation of said rotation; said fluid coupling comprising a ball bearing race having a fluid sealed therein.

2. Apparatus for sensing rotation of a shaft with respect to a fixed element, comprising:

indicating means including a member mounted for rotation about the rotational axis of said shaft, and means for urging said member toward a normal position indicating lack of rotation of said shaft;

ball bearing means between said shaft and member, said bearing means including inner and outer races and sealing means defining therewith a housing for containing fluid in said bearing means said inner race being attached to said shaft and said outer race being attached to said indicating member; and a viscous fluid disposed in said housing between said indicating member and said shaft and forming a viscous coupling for causing said member to move away from said normal position upon rotation of said shaft, and for permitting return of said member to said normal position upon cessation of said rotation.

3. Apparatus for sensing relative rotation between a pair of elements, comprising:

indicating means including a member mounted for rotation about the relative axis of said elements, and means for urging said member toward a normal position indicating lack of relative motion between said elements, said member also having a first displaced position with said member displaced in one rotational direction indicating relative motion in said one direction between said elements, and a second displaced position with said member displaced in an opposite rotational direction indicating relative motion in said opposite direction between said elements; and a fluid coupling between said indicating member and one of said elements for causing said member to move to said respective displaced positions upon corresponding relative motion between said elements, and for permitting return of said member to said normal position upon cessation of said motion; said fluid coupling comprising a ball bearing race having a fluid sealed therein.

4. A motion sensor for a rotatable shaft, comprising:

a member mounted for rotation about the axis of said shaft, and means for urging said member toward a normal position indicating a stationary condition of said shaft, and said member also having a first displaced position with said member circumferentially displaced in one rotational direction with respect to said normal position indicating concurrent rotation of said shaft in said one direction, and a second displaced position with said member circumferentially displaced in an opposite rotational direction with respect to said normal position indicating concurrent rotation of said shaft in said opposite direction;

a fluid coupling between said indicating member and said shaft for causing said member to move to said respective displaced positions upon corresponding rotation of said shaft, and for permitting return of said member to said normal position upon cessation of said rotation; and electrical switch means positioned in at least one of said positions for operative engagement with said indicating member so as to provide an electrical indication of the rotational condition of said shaft; said fluid coupling comprising a ball bearing race having a fluid sealed therein.

5. A motion sensor for a rotatable shaft, comprising:

a member mounted for rotation about the axis of said shaft, and means for urging said member toward a normal position indicating a stationary condition of said shaft;

a fluid coupling between said indicating member and said shaft for causing said member to move circumferentially away from said normal position upon rotation of said shaft, and for permitting return of said member to said normal position upon cessation of said rotation; said fluid coupling comprising a ball bearing race having a fluid sealing therein;

an electrical switch positioned at said normal position for operative engagement with said indicating member, said switch being biassed against operation; and means coupled to said switch to provide an electrical indication of the rotational condition of said shaft.

6. A motion sensor for a rotatable shaft, comprising:

a member mounted for rotation about the axis of said shaft, and means for urging said member toward a normal position indicating a stationary condition of said shaft, said member also having a first displaced position with said member circumferentially displaced in one rotational direction with respect to said normal position indicating concurrent rotation of said shaft in said one direction, and a second displaced position with said member circumferentially displaced in an opposite rotational direction with respect to said normal position indicating concurrent rotation of said shaft in said opposite direction;

a fluid coupling between said indicating member and said shaft for causing said member to move to said respective displaced positions upon corresponding rotation of said shaft, and for permitting return of said member to said normal position upon cessation of said rotation; said fluid coupling comprising a ball bearing race having a fluid sealed therein;

a pair of electrical switches positioned at said first and second positions for operative engagement with said indicating member, said switches being biassed against operation; and means coupled to said switches for providing an electrical indication of the rotational condition of said shaft.

7. In a magnetic tape recording and reproducing machine, a motion sensor for a reel shaft, comprising:

a member mounted for rotation about the axis of said shaft, said member having a normal position indicating a stationary condition of said shaft, a first array of displaced positions with said member circumferentially displaced in one rotational direction with respect to said normal position indicating concurrent rotation of said shaft in said one direction at various speeds, and a second array of displaced positions with said member circumferentially displaced in an opposite rotational direction with respect to said normal position indicating concurrent rotation of said shaft in said opposite direction at various speeds;

spring means coupled to said indicating member for urging said member toward said normal position;

a fluid coupling between said indicating member and said shaft for causing said member to move to said respective displaced positions upon corresponding rotation of said shaft, and for permitting return of said member to said normal position upon cessation of said rotation; said fluid coupling comprising a ball bearing race having a fluid sealed therein;

first and second arrays of electrical switches positioned at said first and second arrays of displaced positions for operative engagement with said indicating member, said switches being biassed against operation; and means coupled to said switches for indicating the direction and degree of displacement of said member as a function of the direction and speed of rotation of said shaft.

8. A motion sensor for a rotatable shaft, comprising:
a member mounted for rotation about the axis of said shaft, said member having a normal position indicating a stationary condition of said shaft;
a magnet mounted on said member at the periphery thereof;
spring means coupled to said member for urging said member towards said normal position thereof;
ball bearing means between said shaft and member, said bearing means including inner and outer races and sealing means defining therewith a housing for containing fluid in said bearing means said inner race being attached to said shaft and said outer race being attached to said indicating member;
a viscous fluid disposed in said housing between said indicating member and said shaft and forming a viscous coupling for causing said member to move circumferentially away from said normal position upon rotation of said shaft, and for permitting return of said member to said normal position upon cessation of said rotation;
a magnetic switch positioned at said normal position for operative magnetic coupling with said magnet of said indicating member, said switch being biassed against operation; and
means coupled to said switch to provide an electrical indication of the rotational condition of said shaft.

9. A motion sensor for a rotatable shaft, comprising:
a member mounted for rotation about the axis of said shaft, said member having a normal position indicating a stationary condition of said shaft, a first displaced position with said member circumferentially displaced in one rotational direction with respect to said normal position indicating concurrent rotation of said shaft in said one direction, and a second displaced position with said member circumferentially displaced in an opposite rotational direction with respect to said normal position indicating concurrent rotation of said shaft in said opposite direction;
a magnet mounted on said member at the periphery thereof;
spring means coupled to said member for urging said member towards said normal position thereof;
ball bearing means between said shaft and member, said bearing means including inner and outer races and sealing means defining therewith a housing for containing fluid in said bearing means said inner race being attached to said shaft and said outer race being attached to said indicating member;
a viscous fluid disposed in said housing between said indicating member and said shaft and forming a viscous coupling for causing said member to move away from said normal position upon rotation of said shaft, and for permitting return of said member to said normal position upon cessation of said rotation;
a pair of magnetic switches positioned at said first and second positions for operative magnetic coupling with said magnet of said indicating member, said switches each being biassed against operation thereof; and
means coupled to said switches for providing an electrical indication of the rotational condition of said shaft.

10. In a magnetic tape recording and reproducing machine, a motion sensor for a reel shaft, comprising:
a member mounted for rotation about the axis of said shaft, said member having a normal position indicating a stationary condition of said shaft, a first array of displaced positions with said member circumferentially displaced in one rotational direction with respect to said normal position indicating concurrent rotation of said shaft in said one direction at various speeds, and a second array of displaced positions with said member circumferentially displaced in an opposite rotational direction with respect to said normal position indicating concurrent rotation of said shaft in said opposite direction at various speeds;
a magnet mounted on said member at the periphery thereof;
spring means coupled to said indicating member for urging said member toward said normal position;
ball bearing means between said shaft and member, said bearing means including inner and outer races and sealing means defining therewith a housing for containing fluid in said bearing means said inner race being attached to said shaft and said outer race being attached to said indicating member;
a viscous fluid disposed in said housing between said indicating member and said shaft and forming a viscous coupling for causing said member to move away from said normal position upon rotation of said shaft, and for permitting return of said member to said normal position upon cessation of said rotation;
first and second arrays of magnetic switches positioned at said first and second arrays of positions, respectively, for operative magnetic coupling with said magnet of said indicating member, said switches each being biassed against operation thereof; and
means coupled to said switches for indicating the direction of and degree of displacement of said member as a function of the direction and speed of rotation of said shaft.

References Cited by the Examiner

UNITED STATES PATENTS

| | | | |
|---|---|---|---|
| 1,761,694 | 6/1930 | Sweet | 73—524 |
| 2,422,973 | 6/1947 | Martin | 200—153.15 |
| 2,668,043 | 2/1954 | Winterburn et al. | 73—524 |
| 2,999,914 | 9/1961 | Stanaway. | |

RICHARD B. WILKINSON, *Primary Examiner.*

FREDERICK M. STRADER, *Examiner.*

C. W. HOFFMAN, M. J. LYNCH,
*Assistant Examiners.*